Figure 3:
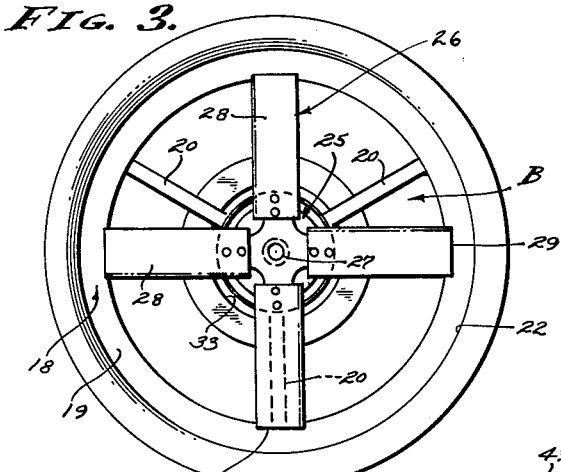

Sept. 25, 1962 M. E. LINDSAY 3,055,145
AIR DISTRIBUTING AND TEMPERING MACHINE
Filed May 18, 1959 3 Sheets-Sheet 1
FIG. 1.
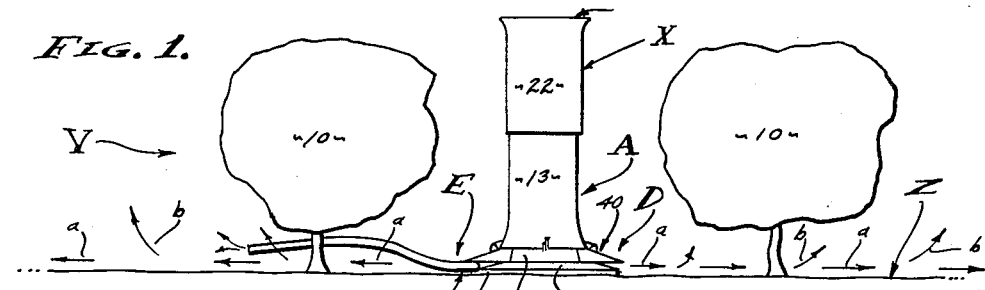
FIG. 2.
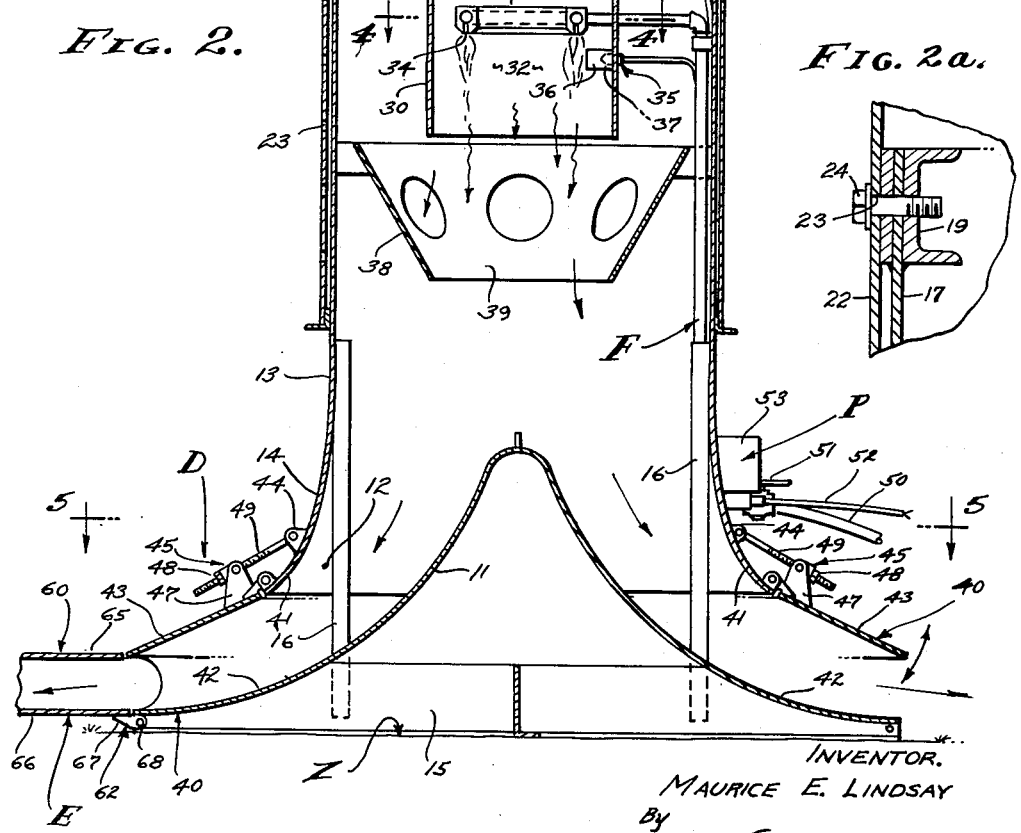
FIG. 2a.
INVENTOR.
MAURICE E. LINDSAY
By
W. H. Maxwell
AGENT Sept. 25, 1962 M. E. LINDSAY 3,055,145
AIR DISTRIBUTING AND TEMPERING MACHINE
Filed May 18, 1959 3 Sheets-Sheet 2

INVENTOR.
MAURICE E. LINDSAY
BY
AGENT

Sept. 25, 1962   M. E. LINDSAY   3,055,145
AIR DISTRIBUTING AND TEMPERING MACHINE
Filed May 18, 1959   3 Sheets-Sheet 3
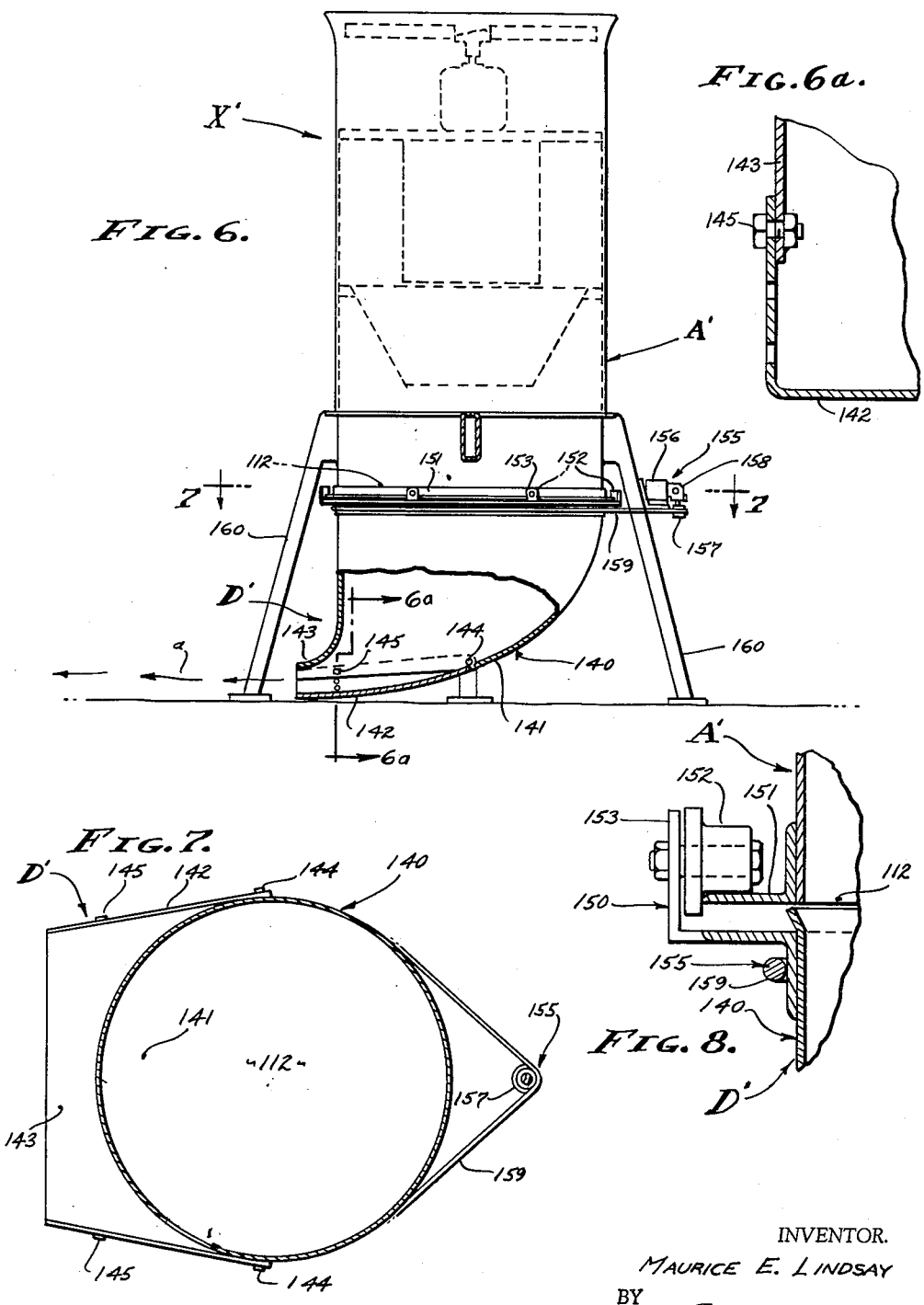
INVENTOR.
MAURICE E. LINDSAY
BY
AGENT United States Patent Office 3,055,145
Patented Sept. 25, 1962

3,055,145
AIR DISTRIBUTING AND TEMPERING MACHINE
Maurice E. Lindsay, Bakersfield, Calif.
(115 Century Blvd., Playa Del Rey, Calif.)
Filed May 18, 1959, Ser. No. 814,022
13 Claims. (Cl. 47—2)

This invention relates to an air distributing and tempering machine and is particularly concerned with an air circulating and heating unit adapted to agricultural use, that is, for the heating of orchards and the like, it being a general object of this invention to provide a machine for distributing tempered air out of doors, and particularly in orchards to prevent frost conditions.

Various machines operating on varied theories have been employed in agriculture for the prevention of frost conditions in orchards or groves. One of such machines is the so-called "smudge-pot" which has been used with a certain amount of success but which has disadvantages in that but a small area surrounding a "smudge-pot" is heated, and in that the heated air simply rises without affecting the air at the foliage of the vegetation. Another of such machines is the so-called "wind-machine" which has also been used successfully, but which has its disadvantages in that such machines rely upon the existence of warm layers of air overlying the area to be conditioned, said warm air being drawn downwardly by the "wind-machine" and directed toward the vegetation. Obviously, if said warm layer of air is non-existent, the "wind-machine" is useless. Therefore, machines have been employed that are a combination of the two above mentioned machines and which not only move the air, as with a "wind-machine," but which also temper the air, as with a "smudge-pot." However, this latter type machine is not completely satisfactory in that said machines do not displace the cold, or freezing air surrounding the vegetation. That is, air, tempered or not, driven by a "wind-machine" simply passes over the vegetation and being warmer than the air surrounding the vegetation, it has a natural tendency to rise without penetrating the foliage and without reaching the ground level. In other words, the cold air at ground level and surrounding the foliage is not necessarily moved or displaced by warmer air, and as a result freezing of the vegetation often occurs in spite of the employment of said machines which are intended to prevent freezing.

An object of this invention is to provide an air handling machine that distributes air in a manner to displace surrounding bodies of unwanted air. With the structure of the present invention a relatively thin layer of air is driven horizontally adjacent the ground level so that it displaces air previously occupying the same space to move it elsewhere.

Another object of this invention is to provide an air displacing machine wherein the air handled by the machine is tempered. With the structure that I provide the thin layer of air that is driven horizontally is a layer of warm air and moves adjacent the ground level so that it displaces could air previously occupying the same space.

It is an object of this invention to provide an air distributing and tempering machine that distributes air in a manner to displace air completely surrounding said machine. The structure, as herein disclosed, operates to direct air radially therefrom in all directions, and preferably equally in all directions.

It is another object of this invention to provide an air distributing machine, as above referred to, that receives air to be distributed without affecting said distribution of the air. The structure, as later described, receives intake air downwardly along a vertical axis and there is an extension that projects upwardly to locate an intake opening at a point spaced substantially above the ground level.

It is still another object of this invention to provide control means in a machine of the character thus far referred to and which directs the layer of discharge air at the desired velocity. The structure provided involves a variable nozzle adapted to throttle the discharge air, and disposed so that the discharge air is directed radially and horizontally from the machine in an ever widening layer.

It is also an object of this invention to provide an air distributing and tempering machine of the character above referred to that involves but few inexpensive and easily formed parts, and which is extremely effective and reliable in its operation.

Figure 4:
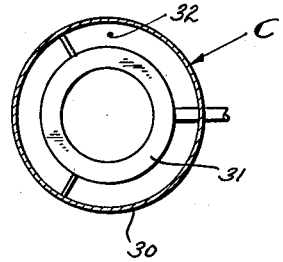
Figure 5:
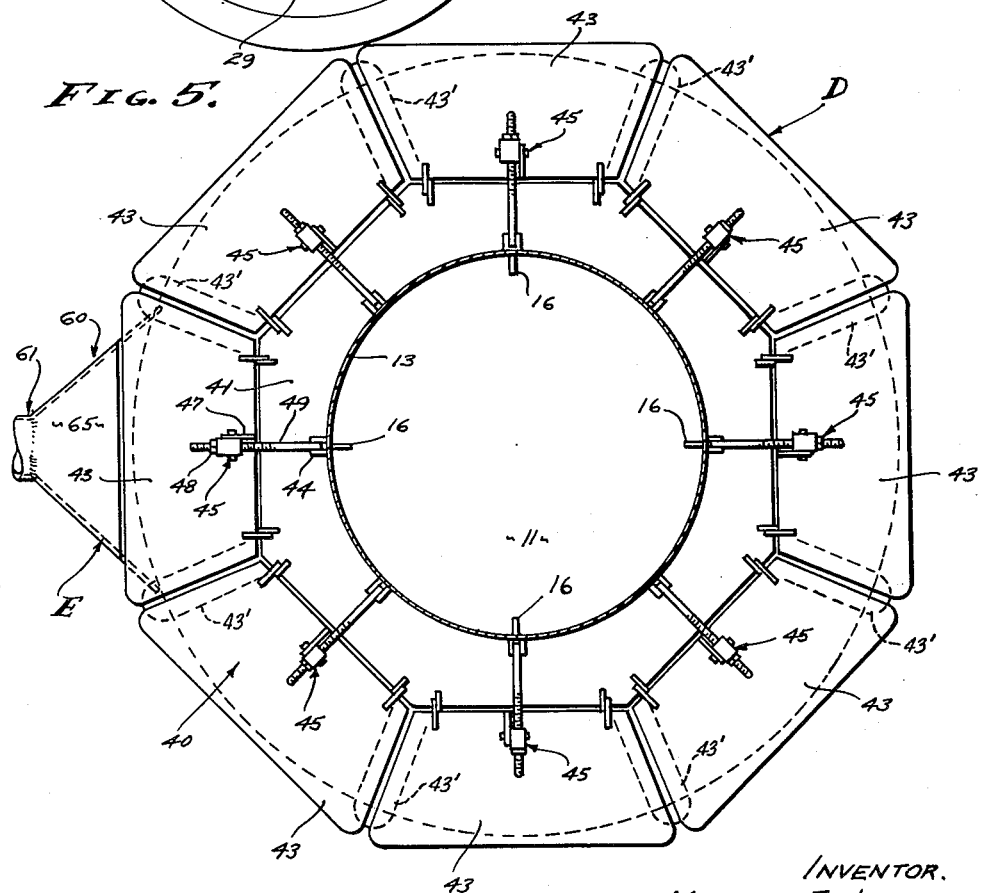

The various objects and features of my invention will be fully understood from the following detailed description of the typical preferred forms and applications of my invention, throughout which description reference is made to the accompanying drawings, in which:

FIG. 1 is a view illustrating the machine unit that I have provided for conditioning and distributing of air in an orchard, or the like. FIG. 2 is an enlarged vertical sectional view of the machine unit shown in FIG. 1. FIG. 2a is an enlarged detailed sectional view of a portion of the unit shown in FIG. 1. FIG. 3 is a plan view of the upper end of the machine and taken as indicated by line 3—3 on FIG. 2. FIG. 4 is a transverse sectional view showing the air tempering means and taken as indicated by line 4—4 on FIG. 2. FIG. 5 is a plan sectional view of the bottom of the machine and taken as indicated by line 5—5 on FIG. 2. FIG. 6 is a vertical sectional view showing a second form of the invention. FIG. 6a is an enlarged detailed sectional view taken as indicated by line 6a—6a in FIG. 6. FIG. 7 is a transverse sectional view taken as indicated by line 7—7 on FIG. 6, and FIG. 8 is an enlarged detailed view of a portion of the structure shown in FIGS. 6 and 7.

The air distributing and tempering machine that I have provided is particularly adapted to distribute tempered air over a wide area displacing from said area untempered air in order to remove cold air bodies. In order to effect the desired end results, the structure, herein disclosed, involves means that are cooperatively related and which direct a horizontally disposed layer of tempered air laterally adjacent the ground level, and with sufficient force and velocity so that said tempered air carries itself a substantial distance before being arrested by friction. In FIG. 1 of the drawings, I have illustrated generally an installation or employment of the machine unit of the present invention, said machine unit X being positioned in an orchard Y, between the trees 10, to direct a horizontally disposed layer of air adjacent the ground level Z, as indicated by the arrows a. As shown, the unit X is placed substantially midway intermediate adjacent rows of trees 10.

The machine unit X is constructed so as to be light weight and portable and involves, generally, an air conducting body A, an air blowing means B, an air tempering means C, and air distributing means D. The body A is a vertically disposed tubular shell that has an air intake at the upper end thereof and which directs said air downward to be discharged laterally of the unit X by the distributing means D located at the base end of the body A. The blowing means B receives air flowing through the body A and moves it downwardly therein to pass by or through the tempering means C. In addition to the foregoing means, the body A of the unit X carries a fuel supply F for the tempering means C, a power supply P for the blowing means B, and other features of construction as hereinafter described.

The air conducting body A is a shell-like tubular body and is preferably round in cross section, and it is disposed vertically on a central axis. The body A is substantially elongate, is open at its upper end, and is preferably, but not necessarily, closed by a bottom 11 at its lower end. The body A is characterized by a discharge opening 12 at the lower end thereof, in which case it is preferred that the bottom 11 be a separate plate-like element, the cylindrical wall 13 of the body A terminating at 14 where it is spaced above the bottom 11 establishing the opening 12. The body A may be venturi-shaped, as shown, the open upper end being flared outwardly and the lower end portion of the body A being flared outwardly, as later described, to form the nozzle of the air distributing means D.

In carrying out the invention, the machine unit X is made portable in that it is of reasonable lightness and is carried on a movable base 15. The particular base 15 illustrated is a skid type base with horizontally disposed members for supporting engagement with the ground level Z. The base 15 carries the bottom 11, and since the wall 13 terminates at a point 14 spaced above the bottom, supports 16 extend upwardly from the base 15 to carry the body A.

In practice, the upper end 17 of the body A is in a plane normal to the central axis thereof, and a header 18 of frame-like construction occupies the open upper end portion of the body. It is preferred that the header 18 have a ring 19 to reinforce the wall 13 of the body, and that it have radial legs 20 adapted to support the elements of the blowing means B and tempering means C.

In the preferred form of the invention, the wall 13 of the body A is approximately one half the ultimate height of the structure, thus providing for ease of handling and facilitating maintenance of the operating elements of the means B and C. In order to gain the desired ultimate height, I have provided an extension 22 of the wall 13 which is shown as a separate tubular part telescopically related to the main body section. As illustrated, the extension 22 is round in cross section and is shiftably engaged over the wall 13 to move vertically. I provide openings 23, for example, a plurality of equally spaced openings 23, longitudinally of the extension 22, and a fastener 24 is engaged through the desired opening 23 and into a part of the wall 13, preferably into the ring 19 at the head 18.

The air blowing means B is provided to move air downwardly through the tubular body A to be discharged laterally of the unit X. The means B may vary in form and is preferably in the form of an axial flow fan or blower. As shown, the means B involves, generally, a drive motor 25 and a rotor 26. The drive motor 25 may be of any suitable type, and is shown as an electric drive motor with a vertically disposed drive shaft 27 coincidental with the central axis of the body A. It is to be understood that the shaft 27 can be belt or gear driven with the drive motor 25 removed from the axis of the drive shaft 27. However, it is preferred that the shaft 27 be directly driven by the motor 25, in which case the axis of the motor 25 and axis of the shaft 27 are coincidental. In FIG. 2 of the drawings, the drive motor 25 is shown carried by the header 18, by legs 20 thereof, and the drive shaft 27 projects from the top end of the motor to carry the rotor 26.

As pointed out above, the means B is preferably an axial flow air handling means, in which case the rotor 26 is in the form of an impeller that is adapted to move, or compress, air axially and longitudinally of the body A, and downwardly therethrough as above described. The particular rotor 26 that I have illustrated involves a plurality of circumferentially spaced vanes or blades 28 that are angularly disposed or pitched, as shown, in order to aerodynamically advance air through the body A when the rotor revolves. The tips 29, or terminal ends, of the blades 28 operate well within the wall of the body A, that is well within the wall 22, so that clearance with the wall is not critical.

The air tempering means C is provided to heat the air as it moves through the body A, that is, as the air moves downwardly through the body under the force of the blowing means B. The means C may be varied in actual type and construction and is preferably in the form of a fuel operated heater that heats or tempers at least a portion of the air passing through the body A to be discharged laterally of the unit X by the means D, later described. The air that is heated or tempered commingles with the remaining air within the body before being discharged therefrom to the end that the air being discharged is uniformly heated.

As shown, the particular air tempering means C that I have illustrated involves, generally, a shroud 30 and a burner 31. The shroud 30 depends from the header 18 and forms a combustion chamber 32 and houses the burner 31 therein. The shroud 30 is preferably substantially smaller in cross sectional configuration than the body A and is disposed longitudinally of the body and is open at its top and bottom ends. The top end of the shroud 30 has a restricted opening 33 adapted to meter the proper amount of air into the chamber 32, while the bottom end of the chamber is unrestricted. The burner 31 is located intermediate the ends of the shroud 30 and, for example, is a ring-shaped burner secured in the housing to face downwardly. That is, the fuel jets 34 of the burner 31 direct fuel axially of the body A within the chamber 32. Further, I provide a suitable ignition means 35 which may, for example, include a shield 36 that covers a pilot jet 37 which continuously burns in order to facilitate ignition of the fuel applied to the burner 31.

In carrying out the invention, a mixing means is provided, if desired, to insure commingling of the heated air with air that passes over or around the air tempering means C. As shown, a cone-shaped ring 38 is supported in the body A below the shroud 30, the cone-shaped ring being inverted to extend downward and inward from the wall 13 of the body A and truncated in order to terminate at an opening 39. The ring 38 is spaced from the wall 13 and the opening is of substantial size so that flow of air is not restricted. Further, the ring 38 may be perforated, as indicated, to the end that thorough commingling of air in the body is accomplished.

The air distributing means D is provided to handle air flowing downwardly through the body A so that it is discharged laterally of the unit X in a layer which is disposed horizontally and adjacent the ground level Z (see arrows a in FIG. 1). The means D is a diffusing means adapted to dispense air from the body A and in accordance with the invention diffuses the flow of air so that it is projected radially outward and laterally from the periphery of the body A. Therefore, the means D involves an annular orifice or nozzle 40 in communication with the opening 12, the nozzle 40 being disposed at or adjacent the ground level Z.

In the form of the invention illustrated, the nozzle 40 is venturi-shaped, or so that air flow is restricted before being discharged. Therefore, I provide a cone-shaped bottom 11 that projects upwardly from the base 15 and so that the wall of the cone-shaped bottom 11 converges with the wall 13 of the body A, as the air flows downwardly. Since air is to be projected laterally in a horizontal plane, the lower marginal portion 41 of the wall 13 is turned or flared outwardly, and the lower peripheral portion 42 of the cone-shaped bottom 11 is also flared outwardly, as shown, to the end that flow of air is substantially horizontal at the periphery of the bottom 11.

The nozzle 40 of the air distributing means D is established by a horizontally disposed lip 43 that is spaced above the peripheral portion 42 of the bottom 11. The diffusing action of the cone-shaped bottom 11 coacting with the outwardly flared portion 41 of the wall 13 is such as to compress the flow of air at the bottom of the body A thereby increasing velocity.

In order to control said velocity of air being discharged horizontally, I prefer to provide a variable orifice or nozzle 40 and which is shown as involving sectional lips 43 pivoted to the body A at 44 and positioned by operators 45. The lips 43 are shown as flat segmental elements juxtapositioned to form a complete circle encompassing the marginal portion 41 of the wall 13 and overlying the peripheral portion 42 of the bottom 11. Flaps 43' of pliant material are secured in position to extend over the gaps between adjacent lips 43 to prevent leakage, the pressure of air flowing through the nozzle holding the flaps 43' in working position to act as seals. The operators 45 are shown as simple screw mechanisms pivoted to the body A at 44 and operating levers 47 to shift and position the lips 43. A nut 48 is operable along a screw 49 in each operator 45 in order to set the lip 43 in the desired selected position.

From the foregoing it will be apparent how the air handling and conditioning unit X is adapted to distribute and temper air. In the case illustrated where fuel is employed to operate the air tempering means C, a fuel supply F involving a supply pipe 50 under control of a valve 51 is provided, and where electricity is employed to operate the air blowing means B an electrical power supply P involving a supply line 52 under control of a switch box 53 is provided.

An attachment E is provided and is combined with the structure hereinabove described to extend the effectiveness of the machine unit X of the present invention. In actual practice, conditions may occur that require special distribution of tempered air. For example, there may be an individual tree 10 removed from the other trees of the orchard Y, or a particular tree that requires individual treatment in order to assure that all cold air has been removed therefrom. There may also occur conditions that simply require wide distribution of air, and therefore I have provided an attachment E which is adapted to be applied to the nozzle 40 to receive a supply of discharge air and to distribute said air as required.

The attachment E involves an adapter 60, a duct 61 and means 62 for securing adapter in working position. The adapter 60 is a boot-like receiving element which is funnel-shaped and with an open end adapted to fit against the nozzle 40 to receive the flow of air. Since the nozzle 40 involves a narrow annular orifice, the adapter 60 is flattened and has a top wall 65 forming a continuation of the lip 43 and has a bottom wall 66 forming a continuation of the peripheral portion 42 of the bottom 11. The duct 61 is preferably any suitable and flexible duct that is easily manipulated and may be of any length, as required. The means 62 for securing the adapter 60 to the machine unit X may be any such means and is shown as a simple lug 67 and pin 68 that connects the adapter 60 to the base 15. In carrying out the invention, one or more attachments E may be employed and, as shown, each adapter 60 encompasses a segment of the nozzle 40. In the particular case illustrated, the adapter 60 is coextensive with one lip section 43, and as indicated, as many as eight attachments E could be used at a time. It will be apparent how use of the variable nozzle 44 and attachments E may be varied as circumstances require.

With the machine unit X in operation, and with the extension 22 projected to the desired height, air is drawn downwardly through the body A by the air blowing means B and it is heated by the air tempering means C. The tempered air is diffused at the lower end of the body A to flow radially outward and is projected in a relatively thin layer from the annular nozzle 40. The nozzle 40 being positioned at the ground level Z directs the air in a horizontally disposed layer a that moves along the ground level in contact therewith. As the air layer a moves laterally, the tempered air comprising said layer a hugs the ground level Z and tends to rise as indicated by the arrows b and it necessarily filters through the foliage of the vegetation. It is to be observed that the layer a that is projected by the nozzle 40 carries a substantial distance and immediately displaces any cold air along the ground level Z, within the range of the machine unit X, and as said layer a is continuously supplemented by the machine unit X all cold air is quickly displaced from the area surrounding the machine. The displacement action necessarily begins at the ground level Z and continues upward as the tempered air rises, the lateral range of the machine unit X being controlled by adjustment of the nozzle 40.

In FIGS. 6, 7 and 8 of the drawings I have shown a second form of the invention wherein a means D' is provided to handle air flow downwardly through the body A' so that it is discharged laterally of the unit X' in a layer that is disposed horizontally and adjacent the ground level (see arrows a in FIG. 6). The means D' is basically the same as the means D above described, and is a diffusing means adapted to dispense air from the body A' and in accordance with the form of invention now under consideration diffuses the flow of air so that it is projected radially outward and laterally from the unit X' in one or more jets or streams, for example, a single jet as shown. Therefore, the means D' involves a nozzle 140 in communication with the opening 112 at the lower end of the body A', the nozzle being disposed at or adjacent the ground level and adapted to obtain relatively high air velocities as said air is discharged therethrough.

In the form of the invention now under consideration, the nozzle 140 is venturi-shaped, or so that air flow is restricted before being discharged. The nozzle 140 is shaped to discharge a flat and widened jet of air radially in one direction and therefore is characterized by being shiftable to turn in different directions. In practice, the nozzle 140 is an elbow-shaped element rotatably carried at the lower end of the body A' and adapted to continually and swivelly turn through 360°. As shown, the nozzle 140 has an outer or bottom wall 141 that extends from one side thereof and transversely to underlie a lip 143. The lip 143 is preferably fixed, while the wall 141 has a movable lip 142 that is adjustably related to the lip 143. In the particular case illustrated, the lower lip 142 is formed by a movable section of the wall 141, said section being pivoted to the nozzle at 144 and adjustably positioned by lock means at 145.

In FIG. 8 of the drawings I have shown means whereby the nozzle 140 is rotated through 360°, said means including a coupling 150 and a drive 155. The coupling 150 involves a track 151 surrounding the periphery of the body A' at the lower terminal end thereof and a plurality of circumferentially spaced rollers 152 rotatably carried on bearing brackets 153 secured to the nozzle 140. As shown, the rollers 152 are flanged in order to center the nozzle in working position as the said rollers engage the track to rotatably support the nozzle 140. As shown in FIG. 6, the body A' is carried by legs 160 that engage the body A' above the track 151. The drive 155 may be any suitable means to rotate the nozzle 140 and is shown as a drum and cable-type drive means involving a drive motor 156 operating a drive drum 157 through a suitable geared head 158. As best illustrated in FIG. 7 a cable or line 159 wraps around the drum 157 and around the nozzle 140 to the end that the nozzle revolves when the motor 156 is energized. It will be apparent that the nozzle 140 can be rotated at the desired speed, or spaced periodically through predetermined intervals, and so that a maximum volume of air is moved by a jet that is delivered by the unit X'.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An air distributing machine for displacing air overlying a ground surface and including, a vertically disposed tubular body with an open upper end spaced substantially from said ground surface, an air projecting nozzle at the lower end of the body and adjacent said ground surface and to discharge air radially thereof and over said ground surface, and air blowing means circulating air downwardly through the body to be discharged by the nozzle.

2. An air distributing machine for displacing air overlying a ground surface and including, a vertically disposed tubular body with an open upper end spaced substantially from said ground surface, an annular air projecting nozzle at the lower end of the body and adjacent said ground surface and to discharge air radially thereof, and air blowing means circulating air downwardly through the body to be discharged by the nozzle.

3. An air distributing machine for displacing air overlying a supporting ground surface and including, a vertically disposed tubular body projecting upwardly from the supporting ground surface and with an inlet opening at its upper end, a horizontally disposed air projecting nozzle at the lower end of the body adjacent said ground surface and to discharge air horizontally from the body and along said ground surface, and air blowing means circulating air downwardly through the body to be discharged by the nozzle.

4. An air distributing machine for displacing air overlying a supporting ground surface and including, a vertically disposed tubular body projecting upwardly from the supporting ground surface and open at its upper end, an annular horizontally disposed air projecting nozzle at the lower end of the body adjacent said ground surface and to discharge air radially and horizontally from the body and along said ground surface, and air blowing means circulating air downwardly through the body to be discharged by the nozzle.

5. An air distributing machine for displacing air overlying a ground surface and including, a vertically disposed tubular body with an open upper end spaced substantially from said ground surface, an air projecting nozzle at the lower end of the body and adjacent said ground surface and with a variable orifice to discharge air radially from the body, and air blowing means circulating air downwardly through the body to be discharged by the nozzle.

6. An air distributing machine for displacing air overlying a ground surface and including, a vertically disposed tubular body with an open upper end spaced substantially from said ground surface, an air projecting nozzle at the lower end of the body and adjacent said ground surface and with a movable lip establishing a variable orifice to discharge air radially from the body, and air blowing means circulating air downwardly through the body to be discharged by the nozzle.

7. An air distributing machine for displacing air overlying a ground surface and including, a vertically disposed tubular body with an open upper end spaced substantially from said ground surface, an annular horizontally disposed air projecting nozzle at the lower end of the body and adjacent said ground surface and with movable lip sections establishing a variable orifice to discharge air radially and horizontally from the body, and air blowing means circulating air downwardly through the body to be discharged by the nozzle.

8. An air distributing machine for displacing air overlying a ground surface and including, a vertically disposed tubular body with an open upper end spaced substantially from said ground surface, a bottom adjacent said ground surface and spaced below the lower end of the body thereby establishing an annular discharge opening, and air blowing means circulating air downwardly through the body to be discharged radially thereof by said opening.

9. An air distributing machine for displacing air overlying a ground surface and including, a vertically disposed tubular body with an open upper end spaced substantially from said ground surface, a bottom adjacent said ground surface and spaced below the lower end of the body thereby establishing an air projecting nozzle opening at the lower end of the body, a movable lip at the nozzle opening establishing a variable orifice to discharge air radially from the body, an air blowing means circulating air downwardly through the body to be discharged by the nozzle opening.

10. An air distributing machine for displacing air overlying a ground surface and including a vertically disposed tubular body with an open upper end spaced substantially from said ground surface, a cone-shaped bottom adjacent said ground surface and spaced below the lower end of the body thereby establishing an annular opening, said cone-shaped bottom projecting upwardly into the lower end portion of the body, an air blowing means circulating air downwardly through the body to be discharged laterally thereof by said opening.

11. An air distributing machine for displacing air overlying a ground surface with tempered air and including, a vertically disposed tubular body with an open upper end spaced substantially from said ground surface, an air projecting nozzle at the lower end of the body and adjacent said ground surface and to direct air radially from the body, air tempering means within the body to act on the air passing through the body, and air blowing means circulating air downwardly through the body to be discharged by the nozzle.

12. An air distributing machine for displacing air overlying a ground surface with tempered air and including, a vertically disposed tubular body with an open upper end spaced substantially from said ground surface, a bottom adjacent said ground surface and spaced below the lower end of the body thereby establishing an opening, air tempering means within the body to act on the air passing through the body, an air projecting nozzle at the lower end of the body and in communication with said opening to discharge air radially of the body, and air blowing means circulating air downwardly through the body to be discharged by the nozzle.

13. An air distributing machine for displacing air overlying a ground surface with tempered air and including, a vertically disposed tubular body an open upper end spaced substantially from said ground surface, a bottom adjacent said ground surface and spaced below the lower end of the body thereby establishing an opening, air tempering means within the body to act on the air passing through the body, an annular air projecting nozzle at the lower end of the body and in communication with said opening to discharge air radially of the body, and air blowing means circulating air downwardly through the body to be discharged by the nozzle.

References Cited in the file of this patent

UNITED STATES PATENTS

| | | |
|---|---|---|
| 1,389,989 | Ross | Sept. 6, 1921 |
| 1,499,894 | Waterman | July 1, 1924 |
| 2,184,109 | Ames | Dec. 19, 1939 |
| 2,369,303 | Kurth et al. | Feb. 13, 1945 |
| 2,390,630 | Wheller | Dec. 11, 1945 |
| 2,457,934 | Spieth | Jan. 4, 1949 |
| 2,525,206 | Clarke | Oct. 10, 1950 |
| 2,613,478 | Ringle | Oct. 14, 1952 |
| 2,640,409 | Hans | June 2, 1953 |
| 2,640,411 | Hans | June 2, 1953 |
| 2,796,699 | Stinson | June 25, 1957 |